United States Patent
Hannwacker et al.

(10) Patent No.: US 10,429,070 B2
(45) Date of Patent: *Oct. 1, 2019

(54) COMBUSTOR ASSEMBLY

(71) Applicant: General Electric Company, Schenectady, NY (US)

(72) Inventors: David Andrew Hannwacker, Torrance, CA (US); Stephen John Howell, West Newbury, MA (US)

(73) Assignee: General Electric Company, Schenectady, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/053,369

(22) Filed: Feb. 25, 2016

(65) Prior Publication Data
US 2017/0248312 A1    Aug. 31, 2017

(51) Int. Cl.
| *F23R 3/60* | (2006.01) |
| *F23R 3/00* | (2006.01) |
| *F23R 3/06* | (2006.01) |
| *F23R 3/10* | (2006.01) |
| *F23R 3/50* | (2006.01) |

(52) U.S. Cl.
CPC .............. *F23R 3/007* (2013.01); *F23R 3/002* (2013.01); *F23R 3/06* (2013.01); *F23R 3/10* (2013.01); *F23R 3/50* (2013.01); *F23R 3/60* (2013.01); *F23R 2900/03042* (2013.01); *Y02T 50/675* (2013.01)

(58) Field of Classification Search
CPC .... F23R 3/007; F23R 3/50; F23R 3/60; F23R 3/002; F23R 2900/00017; F23R 2900/00005; F02C 7/20; F05D 2240/91; F05D 2260/31
See application file for complete search history.

(56) References Cited

U.S. PATENT DOCUMENTS

| 3,922,851 A * | 12/1975 | Irwin ..................... F23R 3/007 60/800 |
| 3,943,703 A | 3/1976 | Kronogard |
| 6,453,675 B1 * | 9/2002 | Royle ..................... F23R 3/007 60/800 |
| 8,141,371 B1 | 3/2012 | Habarou et al. |
| 2004/0118122 A1 | 6/2004 | Mitchell et al. |

(Continued)

FOREIGN PATENT DOCUMENTS

| CN | 1573075 A | 2/2005 |
| CN | 103162311 A | 6/2013 |

(Continued)

OTHER PUBLICATIONS

Machine Translation and Notification of Reason for Refusal issued in connection with corresponding JP Application No. 2016-246074 dated Jan. 16, 2018.
Extended European Search Report and Opinion issued in connection with corresponding EP Application No. 16206150.1 dated Jul. 6, 2017.

(Continued)

*Primary Examiner* — Andrew H Nguyen
(74) *Attorney, Agent, or Firm* — Dority & Manning, P.A.

(57) ABSTRACT

A combustor assembly for a gas turbine engine includes a combustor dome and a combustion chamber liner formed integrally of a ceramic matrix composite material. The combustor dome defines a plurality of openings for receiving a respective plurality of fuel air injector hardware assemblies and may extend continuously along a circumferential direction.

17 Claims, 5 Drawing Sheets

(56) References Cited

U.S. PATENT DOCUMENTS

| | | | |
|---|---|---|---|
| 2004/0237532 A1* | 12/2004 | Howell | F23R 3/002 60/748 |
| 2009/0249790 A1 | 10/2009 | Carrere et al. | |
| 2010/0257864 A1* | 10/2010 | Prociw | F02C 3/145 60/758 |
| 2012/0272652 A1* | 11/2012 | Nicholls | F23R 3/10 60/740 |
| 2012/0328996 A1* | 12/2012 | Shi | F23R 3/007 431/253 |
| 2013/0014512 A1* | 1/2013 | Jarmon | F23R 3/16 60/772 |
| 2017/0248313 A1 | 8/2017 | Hannwacker et al. | |

FOREIGN PATENT DOCUMENTS

| | | |
|---|---|---|
| EP | 1 801 502 A2 | 6/2007 |
| EP | 2 239 436 A2 | 10/2010 |
| JP | 2009-293914 A | 12/2009 |

OTHER PUBLICATIONS

Machine Translation and First Office Action and Search issued in connection with corresponding CN Application No. 201611272995.2 dated Dec. 19, 2018.

* cited by examiner

COMBUSTOR ASSEMBLY

FEDERALLY SPONSORED RESEARCH

This invention was made with government support under contract number W911W6-11-2-0009 of the U.S. Army. The government may have certain rights in the invention.

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, typical combustion sections include an inner liner, an outer liner, and a dome. More commonly, the inner and outer liners are being formed of CMC materials, while the dome is formed of a metal material. The metal dome has conventionally been required to attach certain fuel-air injection assemblies.

However, certain gas turbine engines have had problems accommodating certain mechanical properties of the CMC materials incorporated therein. For example, CMC materials have different coefficients of thermal expansion than the traditional metal materials. Therefore, the attachment of the inner and outer liners, formed of a CMC material, to the dome, formed of a metal material, may require a fairly complicated attachment assembly. Such attachment assemblies may create aerodynamic hurdles for a flow of combustion gasses through the combustion chamber, such as a disruption of the flow of combustion gasses through the combustion chamber. Accordingly, a combustor assembly capable of utilizing CMC materials while improving the aerodynamics within the combustion chamber would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a combustor assembly for a gas turbine engine defining a circumferential direction is provided. The combustor assembly includes a combustor dome and combustion chamber liner formed integrally of a ceramic matrix composite material. The combustor dome defines a plurality of openings for receiving a respective plurality of fuel-air injector hardware assemblies.

In another exemplary embodiment of the present disclosure, a combustor assembly for a gas turbine engine defining a circumferential direction is provided. The combustor assembly includes a combustor dome and combustion chamber liner formed integrally of a ceramic matrix composite material. The combustor dome and combustion chamber liner at least in part define a combustion chamber and extend continuously along the circumferential direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
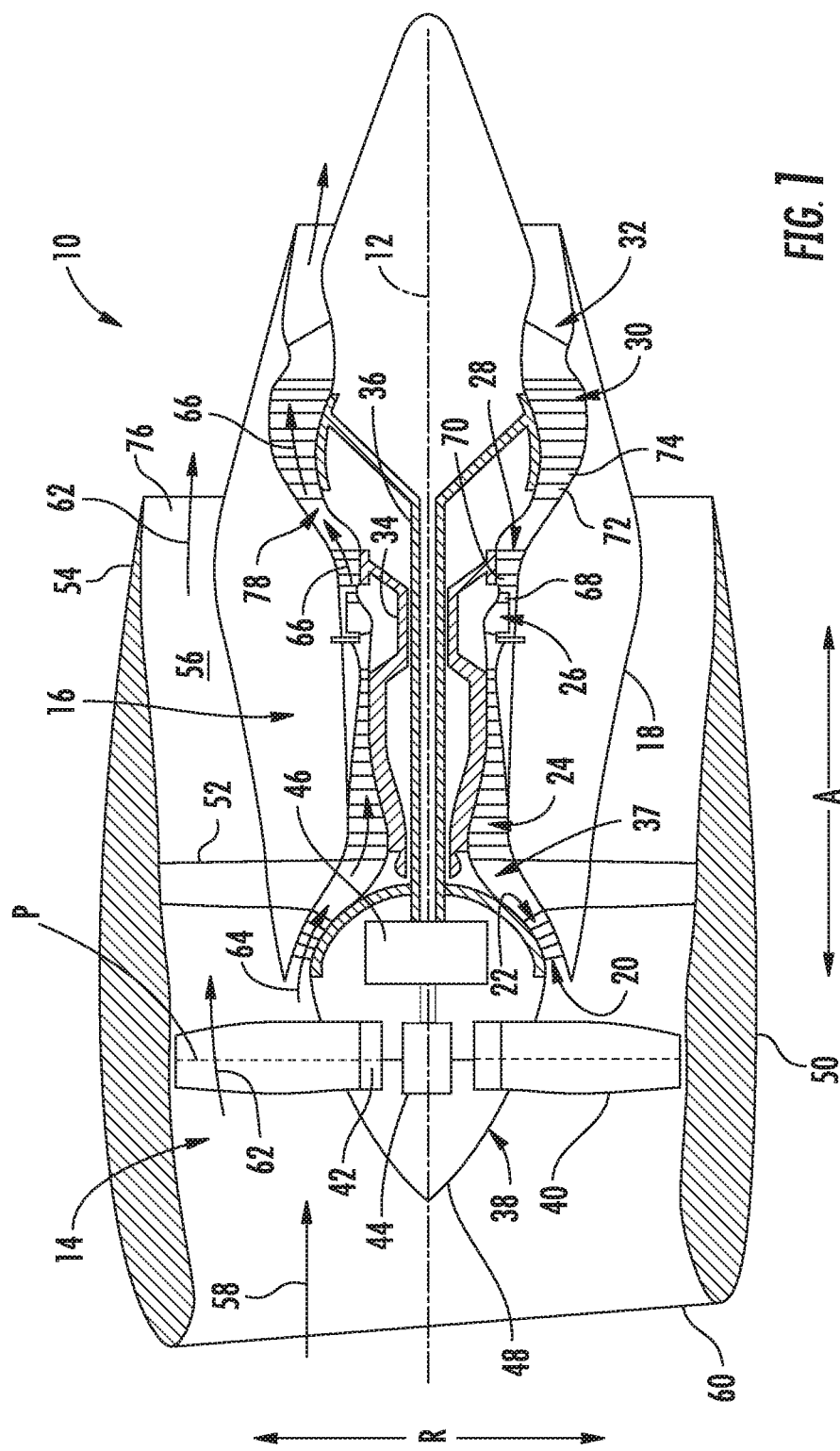
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (not shown) extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
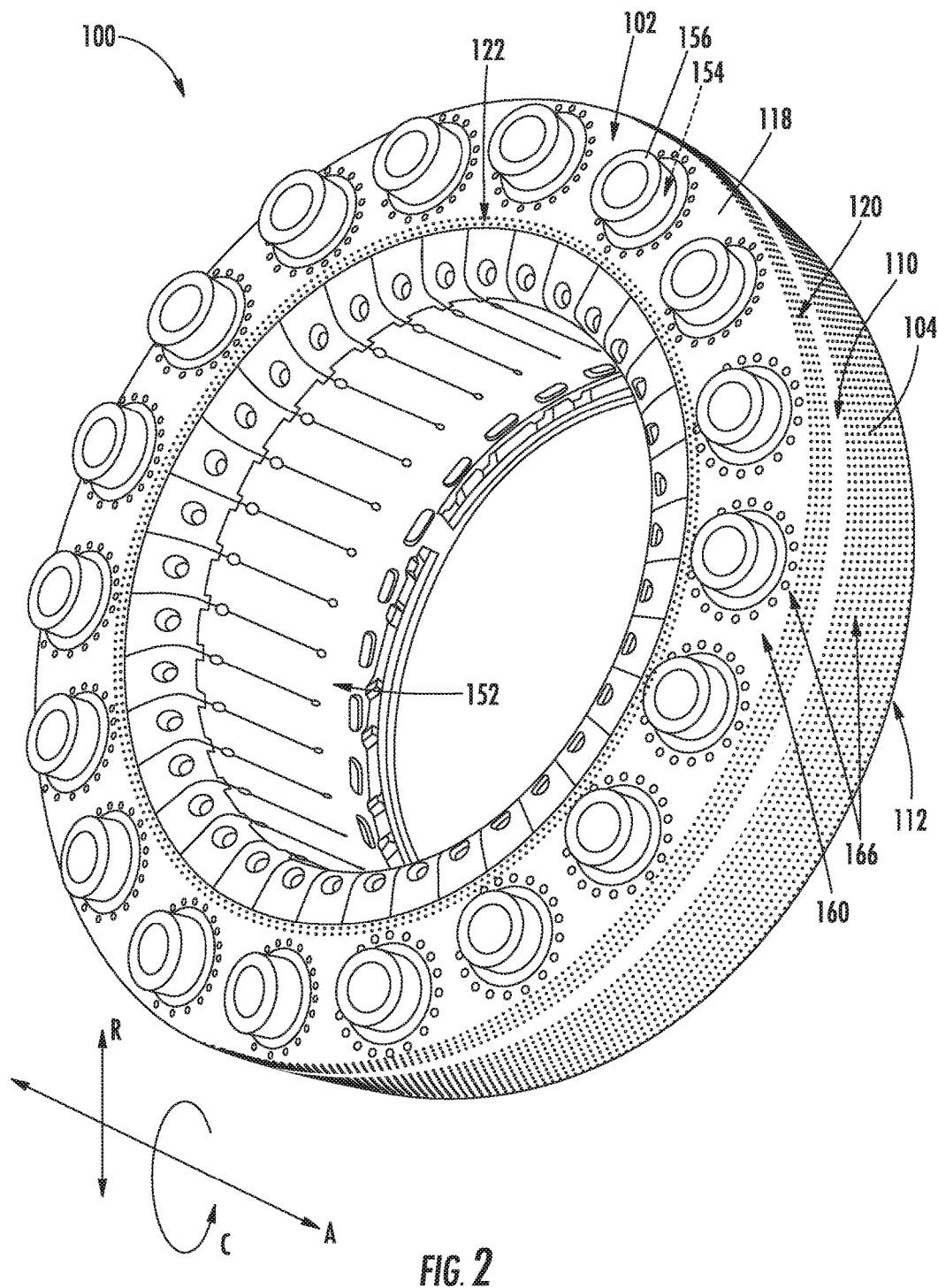
FIG. 2 is a perspective view of a combustor assembly in accordance with an exemplary embodiment of the present disclosure.
Figure 3:
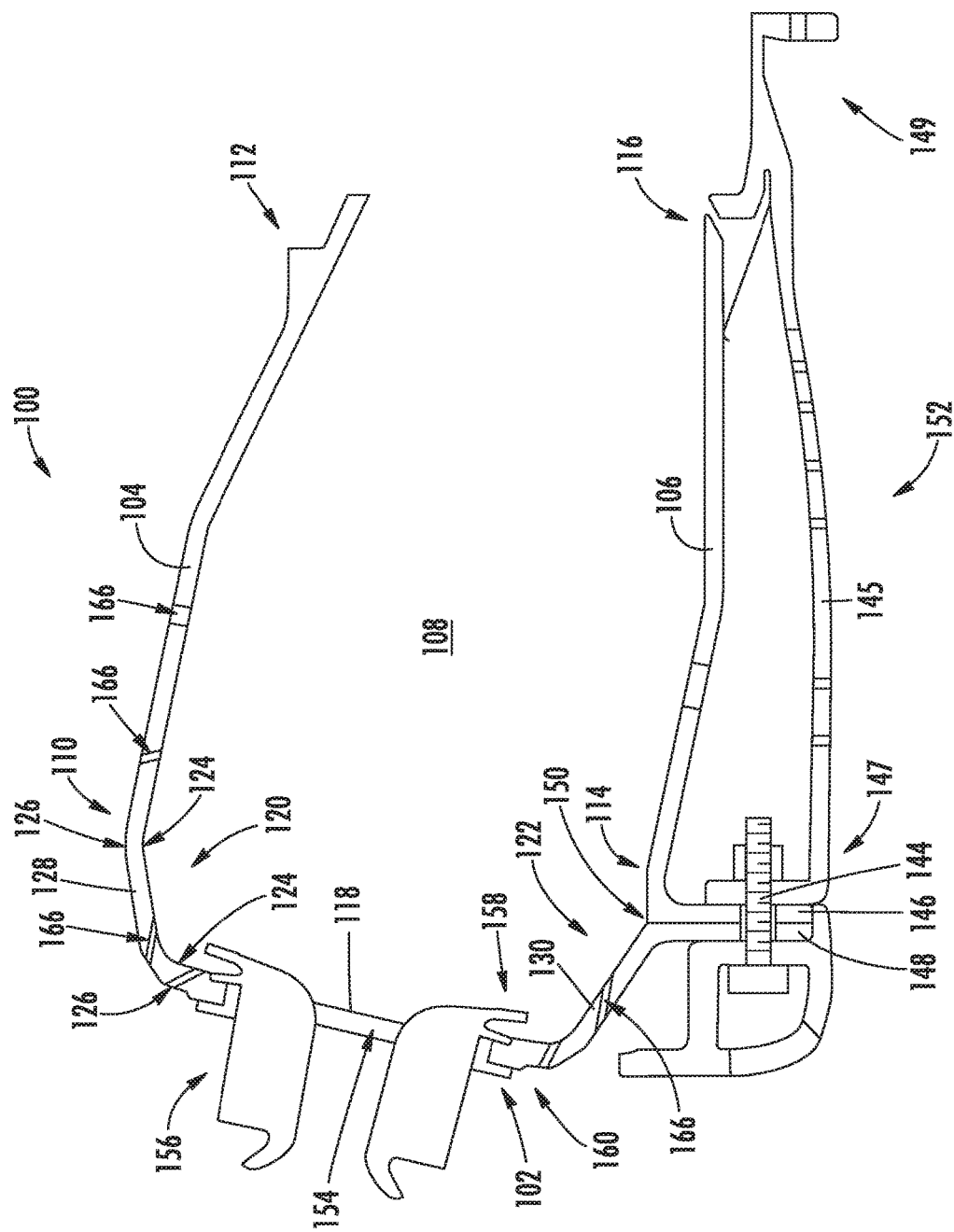
FIG. 3 is a side, cross-sectional view of the exemplary combustor assembly of FIG. 2.

Referring now to FIGS. 2 and 3, views are provided of a combustor assembly 100 for a gas turbine engine in accordance with an exemplary embodiment of the present disclosure. For example, the combustor assembly 100 of FIGS. 2 and 3 may be positioned in the combustion section 26 of the exemplary turbofan engine 10 of FIG. 1, which defines an axial direction A, a radial direction R, and a circumferential direction C. More particularly, FIG. 2 provides a perspective view of the combustor assembly 100 and FIG. 3 provides a side, schematic, cross-sectional view of the exemplary combustor assembly 100 of FIG. 2.

As shown, the combustor assembly 100 generally includes a combustor dome 102 and a combustion chamber liner. For the embodiment depicted, the combustion chamber liner is configured as a combustion chamber outer liner 104, and the combustor dome 102 and combustion chamber outer liner 104 are formed integrally of a ceramic matrix composite ("CMC") material. CMC material is a non-metallic material having high temperature capability. Exemplary CMC materials utilized for the combustor dome 102 and combustion chamber liners (e.g., the outer liner 104) may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

Additionally, the combustor dome 102 and combustion chamber outer liner 104 extend along the circumferential direction C and are formed integrally of a single, continuously formed piece of CMC material. More particularly, the combustor dome 102 and combustion chamber outer liner 104 each extend continuously along the circumferential direction C to define an annular shape, without any seams or joints where separate pieces are combined by, e.g., bolting. It will be appreciated that as used herein, a CMC component form integrally of a single, continuously formed piece of CMC material includes a component formed of overlapping and non-overlapping strips or sheets of CMC formed together using a resin or other suitable joining compound.

As may be seen most clearly in FIG. 3, combustor assembly 100 additionally includes a combustion chamber inner liner 106. Similar to the combustor dome 102 and combustion chamber outer liner 104, the combustion chamber inner liner 106 also extends continuously along the circumferential direction C to define an annular shape. As will be discussed in greater detail below, the combustion chamber inner liner 106 is joined to the combustor dome 102, such that the combustion chamber inner liner 106 and the integrally formed combustion chamber outer liner 104 and combustor dome 102 together define an annular combustion chamber 108. Accordingly, the exemplary combustor assembly 100 depicted is configured as an annular combustor.

Referring to FIG. 3 in particular, the combustion chamber outer liner 104 and combustion chamber inner liner 106 each extend generally along the axial direction A—the combustion chamber outer liner 104 extending between a forward end 110 and an aft end 112 and the combustion chamber inner liner 106 similarly extending between a forward end 114 and an aft end 116. Additionally, the combustor dome 102 includes a forward wall 118 and a transition portion. Specifically, the combustor dome 102 depicted includes an outer transition portion 120 and an inner transition portion 122. The outer transition portion 120 is positioned along an outer edge of the forward wall 118 along the radial direction R and the inner transition portion 122 is positioned along an inner edge of the forward wall 118 along the radial direction R. The inner and outer transition portions 122, 120 each extend circumferentially with the forward wall 118 of the combustor dome 102 (see a FIG. 2).

Further, the outer transition portion 120 extends from the forward wall 118 towards the outer liner 104 and the inner transition portion 122 extends from the forward wall 118 towards the inner liner 106. As stated, for the embodiment depicted the outer liner 104 is formed integrally with the combustor dome 102 (including the forward wall 118 and the outer transition portion 120), and thus the outer transition portion 120 extends seamlessly from the forward wall 118 to the outer liner 104. For example, the combustor dome 102 and combustion chamber outer liner 104 together define a continuous and seamless surface extending from the combustor dome 102 to the combustion chamber outer liner 104. More particularly, the combustor dome 102 and combustion chamber outer liner 104 together define a continuous and seamless inside surface 124 (i.e., facing the combustion chamber 108) and a continuous and seamless outside surface 126 (opposite the inside surface 124).

Figure 4:
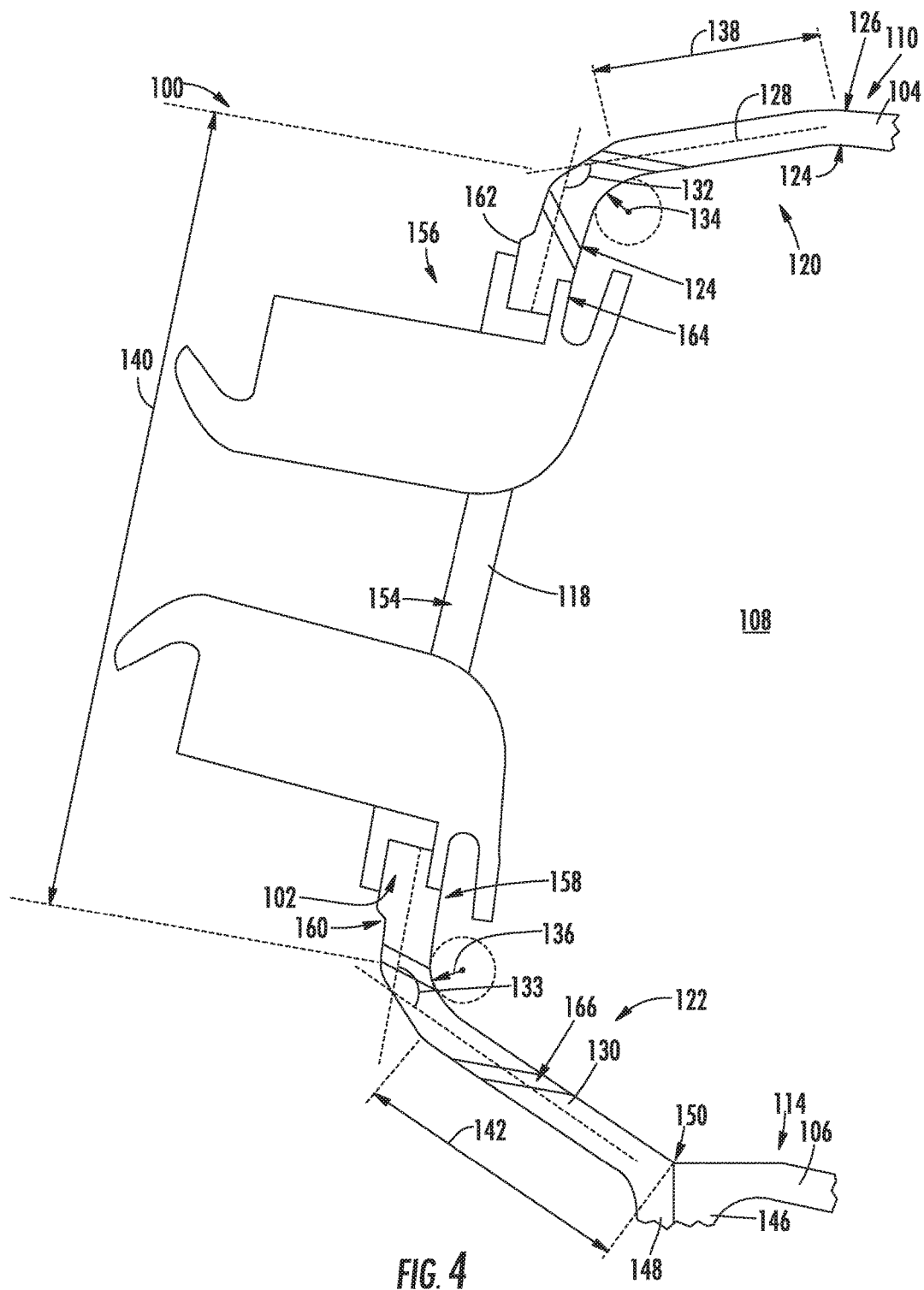
FIG. 4 is a close-up, side, cross-sectional view of the exemplary combustor assembly of FIG. 2.

Referring now briefly to FIG. 4, providing a close-up, cross-sectional, schematic view of a forward end of the combustor assembly 100 of FIGS. 2 and 3, the outer transition portion 120 and inner transition portion 122 each define an angle relative to the forward wall 118. For the embodiment depicted, the outer transition portion 120 and inner transition portion 122 each define an angle 132, 133, respectively, greater than ninety degrees (90°) and less than one hundred and eighty degrees (180°) relative to the forward wall 118. More specifically, the outer transition portion 120 includes a flat 128 (i.e., a substantially flat portion as viewed in the cross-sectional plane depicted in FIG. 4) and the inner transition portion 122 similarly includes a flat 130. The flats 128, 130 of the outer transition portion 120 and inner transition portion 122, respectively, each define an angle 132, 133 greater than ninety degrees (90°) and less than one hundred and eighty degrees (180°) relative to the forward wall 118. Specifically, for the embodiment depicted, the angles 132, 133 of the flats 120, 130 relative to the forward wall 118 is between about one hundred and twenty degrees (120°) and one hundred and fifty degrees (150°), such as about one hundred and thirty-five degrees (135°). It should be appreciated, that as used herein, terms of approximation, such as "about" or "approximately," refer to being within a ten percent (10%) margin of error.

As may also be seen in FIG. 4, the exemplary combustor dome 102 additionally defines an outer radius of curvature 134 between the outer flat 128 of the outer transition portion 120 and the forward wall 118. Notably, the forward wall 118 defines a length 140 between the outer flat 128 and the inner flat 130. In certain exemplary embodiments, the outer radius of curvature 134 may be between about two percent (2%) and about twenty percent (20%) of the length 140 of the forward wall 118. For example, the outer radius of curvature 134 may be between about five percent (5%) and about fifteen percent (15%) of the length 140 of the forward wall 118, or between about eight percent (8%) and about twelve percent (12%) of the length 140 of the forward wall 118. Similarly, the combustor dome 102 may define an inner radius of curvature 136 between the inner flat 130 of the inner transition portion 122 and the forward wall 118. The inner radius of curvature 136 may in certain embodiments, have the same value as the outer radius of curvature 134. It should be appreciated, that as used herein, the term "radius of curvature" refers to radius of a circle that touches a curve at a given point and has the same tangent and curvature at that point.

Moreover, in the cross-sectional plane depicted in FIG. 4, the flat 128 of the outer transition portion 120 defines a length 138 and, as stated, the forward wall 118 of the combustor dome 102 also defines the length 140. The length of 138 the flat 128 may be between about ten percent (10%) and about thirty-five percent (35%) of the length 140 of the forward wall 118 of the combustor dome 102. For example, the length 138 of the flat 128 may be between about fifteen percent (15%) and about thirty percent (30%) of the length 140 of the forward wall 118, or between about twenty percent (20%) and about twenty-five percent (25%) of the length 140 of the forward wall 118. Further, as is depicted, the flat 130 of the inner transition portion 122 also defines a length 142 in the cross-sectional plane depicted. The length 142 of the flat 130 of the inner transition portion 122 may also be between about ten percent (10%) and about thirty-five percent (35%) of the length 140 of the forward wall 118 of the combustor dome 102. For example, the length 142 of the flat 130 may be between about fifteen percent (15%) and about thirty percent (30%) of the length 140 of the forward wall 118, or between about twenty percent (20%) and about twenty-five percent (25%) of the length 140 of the forward wall 118.

A combustor assembly in accordance with one or more embodiments of the present disclosure may provide for desirable flow characteristics through the combustion chamber as well as around the combustion chamber (e.g., for cooling air flowing around the combustion chamber). Specifically, inclusion of an integrally formed combustion chamber outer liner and combustor dome, and/or inclusion of one or more of the inner and outer transition portions with the combustor dome, may allow for more desirable flow characteristics of combustion gasses through the combustion chamber and to a turbine section of a gas turbine engine into which the combustor assembly is installed, as well as around the combustion chamber. For example, inclusion of the transition portions in accordance with an embodiment of the present disclosure may allow cooling flow along a hot side of the dome to blend with a cooling flow along a hot side of the liners (introduced through one or more cooling holes on the liners). Such a configuration may thus allow for a cooling flow over portions of the transition portions where no cooling holes may be present. Additionally, inclusion of the transition portions in accordance with an embodiment of the present disclosure may allow smoother cooling flow over the cold sides of the combustor dome and combustor liners, which may provide for less pressure drop for a cooling air provided to downstream cooling holes in the combustor liners. Further, configuring the combustor dome, combustion chamber inner liner, and combustion chamber outer liner to each extend continuously along a circumferential direction may further increase the desirable flow characteristics of the combustion gases through the combustion chamber by eliminating any seams (such as any axially extending seams) between circumferentially spaced segments and by allowing for uniform thermal expansion and contraction during operation of the combustor assembly.

It should be appreciated, however, that the exemplary combustor assembly 100 depicted in FIGS. 2 through 4, and described herein, are provided by way of example only and that in other exemplary embodiments of the present disclosure, the combustor assembly 100 may have any other suitable configuration. For example, in other exemplary embodiments, the combustion chamber outer liner 104 may not be formed integrally with the combustor dome 102, and instead may be attached to the combustor dome 102 in any suitable manner. Further, in certain exemplary embodiments, the combustion chamber inner liner 106 may be integrally formed with the combustor dome 102 instead of or in addition to the combustion chamber outer liner 104. Moreover, in still other embodiments, the combustor dome 102 may have any other suitable configuration. For example, in certain embodiments, the combustor dome 102 may not include one or both of the outer transition portion 120 or the inner transition portion 122. Or alternatively, one or both of the outer transition portion 120 or the inner transition portion 122 may be configured in any other suitable manner.

Referring again to FIGS. 2 and 3, the outer transition portion 120 of the combustor dome 102, as stated, is formed integrally with and extends seamlessly into the combustion chamber outer liner 104. By contrast, however, for the embodiment depicted the combustion chamber inner liner 106 is formed separately from the combustor dome 102 and combustion chamber outer liner 104. The combustion chamber inner liner 106 is attached to the combustor dome 102 using a bolt 144. Specifically, the combustion chamber inner liner 106 includes an attachment flange 146 extending inward along the radial direction R at the forward end 114 and the combustor dome 102 similarly includes an attachment flange 148 extending inward along the radial direction R at a radially inner end. The bolt 144 extends through the flange 146 of the combustion chamber inner liner 106 and the flange 148 of the combustor dome 102 to attach the two components. Notably, the combustion chamber inner liner 106 and combustor dome 102 abut at an inner surface (i.e., facing the combustion chamber 108) to define a substantially continuous surface, with the exception of a single seam 150 extending circumferentially where the two components are joined.

The bolt 144 is configured as part of a mounting assembly 152 of the combustor assembly 100. The mounting assembly 152 generally includes a support member 145 extending generally between a forward end 147 and an aft end 149, attaching to the combustion chamber inner liner 106 and combustor dome 102 at the forward end 147. At the aft end 149, the support member is mountable to, e.g., a casing or other support structure within the gas turbine engine. Accordingly, the combustion chamber outer liner 104, combustor dome 102, and combustion chamber inner liner 106 may each be supported within the gas turbine engine at a forward end of the combustor assembly 100 (i.e., at the forward end 114 of the inner liner 106) through the support member 145 of the mounting assembly 152.

Referring still to FIGS. 2 and 3, the combustor dome 102 additionally defines an opening 154 and the combustor assembly 100 includes a fuel-air injector hardware assembly 156. More particularly, the combustor dome 102 defines a plurality of openings 154 and the combustor assembly 100 includes a respective plurality of fuel-air injector hardware assemblies 156—each opening 154 configured for receiving a respective one of the plurality of fuel-air injector hardware assemblies 156. For the embodiment depicted, each of the openings 154 are substantially evenly spaced along the circumferential direction C, or more particularly are substantially evenly spaced from one another along the circumferential direction C.

The plurality of fuel-air injector hardware assemblies 156 may each include, e.g., a swirler and/or a baffle. Generally, the fuel-air injector hardware assemblies 156 are configured to receive a flow of combustible fuel from a fuel nozzle (not shown) and compressed air from a compressor section of a gas turbine engine in which the combustor assembly 100 is installed (see FIG. 1). The fuel-air injector hardware assemblies 156 mix the fuel and compressed air and provide such fuel-air mixture to the combustion chamber 108. Although not depicted, an igniter may extend at least partially into the combustion chamber 108 to initially ignite the fuel-air mixture.

Figure 5:
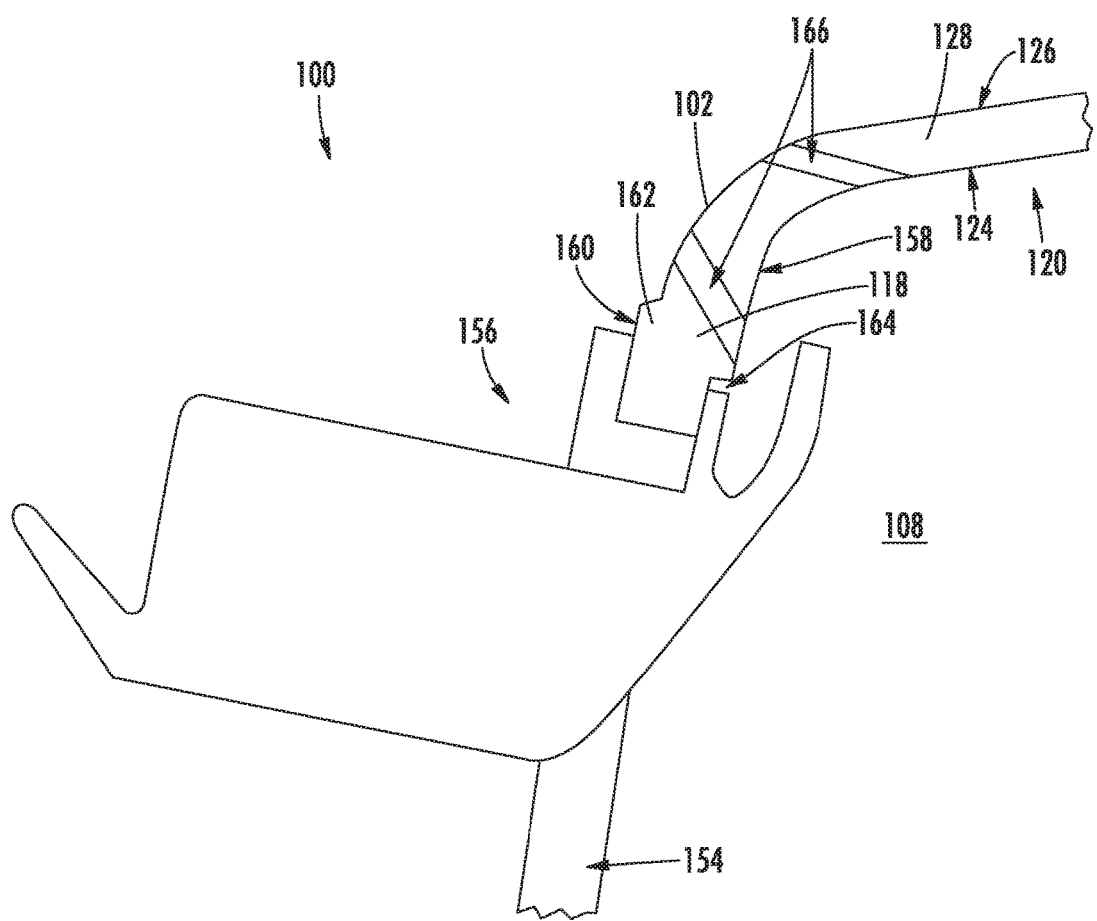
FIG. 5 is a close-up, side, cross-sectional view of an opening in a combustor dome of the exemplary combustor assembly of FIG. 2.

Referring now also to FIG. 5, providing a close-up, cross-sectional, schematic view of the combustor dome 102 and a fuel injector hardware assembly 156, for the embodiment depicted, each fuel-air injector hardware assembly 156 is attached directly to the combustor dome 102 and a respective one of the plurality of openings 154. Additionally, as is depicted, each fuel-air injector hardware assembly 156 extends into or through such opening 154. More particularly, the combustor dome 102 defines a hot side 158 exposed to the combustion chamber 108 and an opposite cold side 160. Although not depicted, combustor dome may include a protective coating, such as an environmental protective coating, at the hot side 158 and/or the cold side 160. The combustor dome 102 includes a raised boss 162 extending around each of the plurality of openings 154 in the combustor dome 102 on the cold side 160 of the combustor dome 102, and a groove 164 extending around each of the plurality openings 154 in the combustor dome 102 on the hot side 158 of the combustor dome 102. The raised boss 162 and groove 164 of the combustor dome 102 are configured for assisting with mounting the fuel-air injector hardware assemblies 156 directly to the combustor dome 102.

Specifically, the raised boss 162 allows for a desired thickness, such that the fuel-air injector hardware assemblies 156 may be attached directly to the combustor dome 102. For example, as is depicted the fuel-air injector hardware assemblies 156 are each attached directly to the hot side 158 of the combustor dome 102 (i.e., at the groove 164) and to the cold side 160 of the combustor dome 102 (i.e., at the raised boss 162). Notably, referring back to FIG. 2, at least one of the fuel-air injector hardware assemblies 156 is attached directly to the combustor dome 102 independently of an adjacent fuel-air injector hardware assembly 156, or more specifically each of the fuel-air injector hardware assemblies 156 are attached directly to the combustor dome 102 independently of the adjacent fuel-air injector hardware assemblies 156. For example, as the combustor assembly 100 depicted includes a combustor dome 102 extending continuously along the circumferential direction C, no additional or supplemental supports are required for the combustor dome 102 and plurality of fuel-air injector hardware assemblies 156.

As may also be seen most clearly in FIG. 2, the combustor dome 102 defines a plurality of cooling holes 166 extending through the combustor dome 102 from the cold side 160 to the hot side 158 to allow for a flow of cooling air therethrough. As may be seen, the plurality of cooling holes 166 includes a plurality of cooling holes extending around and encircling at least one of the openings 154 defined in the combustor dome 102 for receiving the respective fuel-air injector hardware assemblies 156. Particularly, for the embodiment depicted, the plurality of cooling holes 166 include a plurality of cooling holes extending around and encircling each of the openings 154 defined in the combustor dome 102. Additionally, the combustor dome 102 includes a variety of additional cooling holes 166 defined in the forward wall 118 of the combustor dome 102. Further, the combustor dome 102 defines a plurality of cooling holes 166 extending through the outer transition portion 120 of the combustor dome 102 and the inner transition portion 122 of the combustor dome 102 (see, e.g., FIG. 3) from the cold side 160 to the hot side 158 to allow for a flow of cooling air therethrough. Moreover, the combustion chamber outer liner 104 includes a plurality of cooling holes 166 extending therethrough in a similar manner to allow for an additional amount of cooling air to flow therethrough. The cooling air may be provided from a compressor section of a gas turbine engine into which the combustor assembly 100 is installed.

Inclusion of an integrally formed combustion chamber liner and combustor dome, and/or a combustor dome having one or both of an inner transition portion or outer transition portion, may allow for direct localized cooling of certain areas of the components forming the combustion chamber without substantially disrupting a flow of combustion gasses through the combustion chamber.

It should be appreciated, however, that the exemplary embodiment depicted in FIGS. 2 through 5 is provided by way of example only, and that in other exemplary embodiments, the combustor assembly 100 may have any other suitable configuration. For example, in other exemplary embodiments, the fuel-air injector hardware assemblies 156 may be configured in any other suitable manner, and also may be attached to the combustor dome 102 in any other suitable manner. Further, in other exemplary embodiments, one or more of the combustion chamber outer liner 104, combustor dome 102, and combustion chamber inner liner 106 may have any other suitable configuration of cooling holes 166 or other cooling means for maintaining a temperature of such components within a desired temperature range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining a circumferential direction, the combustor assembly comprising:
    a combustor dome and a combustion chamber liner formed integrally of a ceramic matrix composite material, the combustor dome defining a plurality of openings for receiving a plurality of fuel-air injector hardware assemblies;
    wherein the combustion chamber liner and the combustor dome define in part a combustion chamber extending from a forward end to an aft end, wherein the combustion chamber liner extends continuously from the forward end of the combustion chamber to the aft end of the combustion chamber,
    wherein the combustor dome comprises a transition portion and a forward wall, wherein the transition portion extends seamlessly from the forward wall of the combustor dome to the combustion chamber liner and defines an angle greater than 90 degrees and less than 180 degrees relative to the forward wall;
    wherein the transition portion defines a flat extending away from the forward wall of the combustor dome and wherein the combustor dome defines a radius of curvature between the transition portion and the forward wall, wherein the forward wall defines a length, and wherein the radius of curvature is between about 2 percent and about 20 percent of the length of the forward wall.

2. The combustor assembly of claim 1, wherein the combustor dome and the combustion chamber liner define a continuous and seamless surface extending from the combustor dome to the combustion chamber liner.

3. The combustor assembly of claim 1, wherein the combustor dome and the combustion chamber liner are formed integrally of a single, continuous piece of the ceramic matrix composite material, and wherein the combustor dome and the combustion chamber liner extend continuously along the circumferential direction to define an annular shape.

4. The combustor assembly of claim 1, wherein the plurality of openings are substantially evenly spaced from one another.

5. The combustor assembly of claim 1, wherein the combustion chamber liner is a combustion chamber outer liner.

6. The combustor assembly of claim 1, wherein the combustor dome includes a raised boss extending around each of the plurality of openings in the combustor dome for mounting a fuel-air injector hardware assembly of the plurality of fuel-air injector hardware assemblies directly to the combustor dome.

7. The combustor assembly of claim 1, further comprising: wherein each fuel-air injector hardware assembly of the plurality of fuel-air injector hardware assemblies is attached directly to the combustor dome at a respective opening of the plurality of openings.

8. The combustor assembly of claim 7, wherein each fuel-air injector hardware assembly of the plurality of fuel-air injector hardware assemblies is attached directly to the combustor dome independently of a circumferentially adjacent fuel-air injector hardware assembly of the plurality of fuel-air injector hardware assemblies.

9. A combustor assembly for a gas turbine engine defining a circumferential direction, the combustor assembly comprising:
a combustor dome and a combustion chamber liner formed integrally of a ceramic matrix composite material, the combustor dome and the combustion chamber liner at least in part defining a combustion chamber and extending continuously along the circumferential direction;
wherein the combustion chamber liner and the combustor dome define in part the combustion chamber extending from a forward end to an aft end, wherein the combustion chamber liner extends continuously from the forward end of the combustion chamber to the aft end of the combustion chamber,
wherein the combustor dome comprises a transition portion and a forward wall, wherein the transition portion extends seamlessly from the forward wall of the combustor dome to the combustion chamber liner and defines an angle greater than 90 degrees and less than 180 degrees relative to the forward wall;
wherein the transition portion defines a flat extending away from the forward wall of the combustor dome and wherein the combustor dome defines a radius of curvature between the transition portion and the forward wall, wherein the forward wall defines a length, and wherein the radius of curvature is between about 2 percent and about 20 percent of the length of the forward wall.

10. The combustor assembly of claim 9, wherein the combustor dome and the combustion chamber liner define a continuous and seamless surface extending from the combustor dome to the combustion chamber liner.

11. The combustor assembly of claim 9, wherein the combustor dome and the combustion chamber liner are formed integrally of a single, continuous piece of the ceramic matrix composite material.

12. The combustor assembly of claim 9, wherein the combustor dome defines a plurality of openings for receiving a plurality of fuel-air injector hardware assemblies, and wherein the plurality of openings are substantially evenly spaced from one another.

13. The combustor assembly of claim 9, wherein the combustor dome includes a raised boss extending around each of a plurality of openings in the combustor dome for mounting hardware directly to the combustor dome.

14. The combustor assembly of claim 1, wherein the transition portion defines the flat defining the angle relative to the forward wall, wherein the flat defines a length, and wherein the length of the flat is between about 10 percent and about 35 percent of the length of the forward wall.

15. The combustor assembly of claim 1, wherein the angle defined by the transition portion relative to the forward wall is between about one hundred and twenty degrees and one hundred and fifty degrees.

16. A combustor assembly for a gas turbine engine defining a circumferential direction, the combustor assembly comprising:
a combustor dome and combustion chamber liner formed integrally of a ceramic matrix composite material, the combustor dome defining a plurality of openings for receiving a plurality of fuel-air injector hardware assemblies;
wherein the combustion chamber liner and the combustor dome define in part a combustion chamber extending from a forward end to an aft end, wherein the combustion chamber liner extends continuously from the forward end of the combustion chamber to the aft end of the combustion chamber;
wherein the combustor dome comprises a transition portion and a forward wall, wherein the transition portion extends seamlessly from the forward wall of the combustor dome to the combustion chamber liner and defines an angle greater than 90 degrees and less than 180 degrees relative to the forward wall;
wherein the transition portion defines a flat defining the angle relative to the forward wall, wherein the forward wall defines a length, wherein the flat defines a length, and wherein the length of the flat is between about 10 percent and about 35 percent of the length of the forward wall; and
wherein the combustor dome defines a radius of curvature between the transition portion and the forward wall, and wherein the radius of curvature is between about 2 percent and about 20 percent of the length of the forward wall.

17. The combustor assembly of claim 16, wherein the length of the flat is between about 20 percent and about 25 percent of the length of the forward wall, and wherein the radius of curvature is between about 5 percent and about 15 percent of the length of the forward wall.

\* \* \* \* \*